(12) United States Patent
Lafler et al.

(10) Patent No.: US 6,357,335 B1
(45) Date of Patent: Mar. 19, 2002

(54) PNEUMATIC VOLUME BOOSTER FOR VALVE POSITIONER

(75) Inventors: Lawrence R. Lafler; Douglas J. Tanner, both of St. Cloud, MN (US)

(73) Assignee: Sox Corporation, Muskegon, MI (US)

( * ) Notice: Subject to any disclaimer, the term of this patent is extended or adjusted under 35 U.S.C. 154(b) by 0 days.

(21) Appl. No.: 09/471,921

(22) Filed: Dec. 23, 1999

(51) Int. Cl.⁷ .......................... F15B 11/08; F15B 13/044

(52) U.S. Cl. .......................................... 91/461; 91/459

(58) Field of Search .......................... 91/454, 455, 456, 91/459, 461; 137/596.14, 596.16; 251/61.2

(56) References Cited

U.S. PATENT DOCUMENTS

| | | | |
|---|---|---|---|
| 1,473,173 A | * 11/1923 | Brinkerhoff | 92/49 |
| 2,577,967 A | * 12/1951 | Hughes | 251/61.2 X |
| 2,672,731 A | * 3/1954 | Ashton | 91/459 X |
| 2,900,960 A | * 8/1959 | Gratzmuller | 91/454 X |
| 3,080,887 A | * 3/1963 | Brandenberg | 137/596.14 |
| 3,559,945 A | * 2/1971 | Coiner et al. | 251/61.2 |
| 3,653,408 A | * 4/1972 | Coiner | 251/61.1 X |
| 3,768,875 A | * 10/1973 | Davis et al. | 91/454 X |
| 3,897,041 A | * 7/1975 | Cowan | 251/61.1 |
| 4,392,375 A | 7/1983 | Eguchi et al. | |
| 4,479,678 A | * 10/1984 | Sharp | 91/454 X |
| 4,794,940 A | * 1/1989 | Albert et al. | 251/61.2 X |
| 4,875,500 A | 10/1989 | Ariizumi et al. | 137/596.18 |
| 4,893,502 A | 1/1990 | Kubota et al. | |
| 5,079,472 A | 1/1992 | Uhl et al. | |
| 5,161,775 A | * 11/1992 | Miller | 251/61.1 X |
| 5,162,987 A | 11/1992 | Sambhu | |
| 5,251,148 A | 10/1993 | Haines et al. | |
| 5,332,965 A | 7/1994 | Wolf et al. | |
| 5,343,894 A | 9/1994 | Frisch et al. | |
| 5,431,182 A | 7/1995 | Brown | |
| 5,434,774 A | 7/1995 | Seberger | |
| 5,451,923 A | 9/1995 | Seberger et al. | |
| 5,454,399 A | * 10/1995 | Kazakis et al. | 137/596.16 |
| 5,485,400 A | 1/1996 | Warrior et al. | |
| 5,497,081 A | 3/1996 | Wolf et al. | |
| 5,549,137 A | 8/1996 | Lenz et al. | |
| 5,558,115 A | 9/1996 | Lenz et al. | |
| 5,564,470 A | 10/1996 | Denmark et al. | |
| 5,570,015 A | 10/1996 | Takaishi et al. | |
| 5,573,032 A | 11/1996 | Lenz et al. | |
| 5,590,677 A | 1/1997 | Kuroda | |

(List continued on next page.)

FOREIGN PATENT DOCUMENTS

| | | | | |
|---|---|---|---|---|
| DE | 2232664 | * | 1/1974 | .................. 91/454 |
| WO | 9905576 | | 2/1999 | |

OTHER PUBLICATIONS

Selected pages from Siemens Sipart PS2 Eletropneumatic Positioner 6DR400x–xx Manual.

Primary Examiner—John E. Ryznic
(74) Attorney, Agent, or Firm—Baker & Hostetler L.L.P.

(57) ABSTRACT

The system controls the position of a pneumatically operated valve using an electrical control signal from a controller. A pilot circuit of the system has multiple piezo valves that are subject to electrical signals from the controller to provide pneumatic output signals to a volume booster circuit of the system. Relatively small volume pneumatic pilot signals from the piezo valves are used to determine the opened or closed state of higher volume valve assemblies of the booster circuit which connect or disconnect the actuator of the valve to be operated with a source of pressurized gas. Both the piezo valves and the booster valve assemblies are subjected to gas at the same operating pressure, but the surface area of pistons in the booster valve assemblies exposed to the piezo valves is substantially larger than the surface area of the pistons exposed to operating pressure such that the pneumatic signals shift the pistons even when pressure is the same on both sides thereof. Both single-acting and double-acting embodiments are disclosed, as well as alternative versions of booster valve assemblies.

18 Claims, 5 Drawing Sheets

U.S. PATENT DOCUMENTS

| | | |
|---|---|---|
| 5,673,278 A | 9/1997 | Mills et al. |
| 5,678,601 A | 10/1997 | Engel |
| 5,684,451 A | 11/1997 | Seberger et al. |
| 5,692,724 A | 12/1997 | Champagne |
| 5,793,963 A | 8/1998 | Tapperson et al. |
| 5,848,609 A | 12/1998 | Marchesseault et al. |

\* cited by examiner

PNEUMATIC VOLUME BOOSTER FOR VALVE POSITIONER

TECHNICAL FIELD

This invention relates to control systems for the pneumatically powered actuators of valves such as those often used in the pulp and paper, chemical and petroleum industries. More particularly, it relates to a system that provides for controlling the position of a pneumatically operated valve with an electrical control signal.

BACKGROUND

It is desirable to utilize piezo valves as part of a control system for a pneumatically powered valve actuator because piezo valves provide an extremely long cycle life and reliability, extremely low power requirements, and fast on/off times. However, the volume of air they pass is relatively small compared to the volume required to quickly move a control valve into a new adjusted position. In some industrial applications, a relatively significant force is required to achieve movement of the valve, necessitating a correspondingly large surface area on the part of the actuator exposed to air pressure. Piezo valves are typically unable to provide the sustained volume of air necessary over the surface area of the movable part.

SUMMARY OF THE INVENTION

Accordingly, an object of the present invention is to provide a valve control system that utilizes piezo valves to take advantage of their inherently desirable characteristics, yet the volume of air supplied to the valve actuator of the system is boosted to such an extent that the actuator quickly repositions the valve into the desired adjusted position.

In carrying out the foregoing object, the present invention contemplates a system in which multiple piezo valves are subject to an electrical control signal to either initiate or terminate a pilot pneumatic output at the established control pressure. Such pilot output is in turn directed to appropriate valve assemblies of a volume booster circuit which is likewise connected to a source of pressurized gas at the same pressure as that supplied to the piezo valves. Thus, the pneumatic pilot signal from the piezo valves is used to determine the opened or closed state of valve assemblies in the booster mechanism. These booster valve assemblies are capable of passing much greater volumes of gas to the actuators than the small pilot signals produced by the piezo valves. Consequently, the instantaneous action of the piezo valves is obtained, along with sufficiently large volumes of gas to quickly move the operating part of the actuator.

The control system of the present invention utilizes pistons in the booster valve assemblies that operate on the principle of unequal piston areas on opposite operating surfaces thereof. Thus, both surfaces of the piston may be simultaneously exposed to the same operating pressure in the form of a pneumatic signal from the piezo valve and an operating volume from the gas source. However, even though the pressures are the same on both faces of the piston, the piston will be moved in a direction generally toward the smaller surface area because the total force on the piston is greater on the side with the larger surface area. In the preferred form of the invention, the side of the piston exposed to the pneumatic signal from the piezo valve is the side with the large surface area, while the side exposed directly to the gas source is the smaller.

In preferred forms, the control system may be either single acting or double-acting. In a system configured for a single acting actuator, the actuator has only one operating gas chamber on one side of its movable part, while a spring is disposed on the opposite side. In a double-acting version, pressure chambers are located on opposite sides of the movable part of the actuator so that pressurized gas is used to move the part in both of its adjusting directions of movement. In both versions, the control system is capable of moving the actuator in valve opening or valve closing directions, plus holding the actuator in a selected stationary position.

In its preferred form, each booster valve assembly utilizes a piston confined between a pair of diaphragms as the shut-off valve component within the assembly. The piston responds to the pneumatic pilot pressure to push one of the diaphragms into sealing engagement with the valve seat and thus close the operating flow path through the valve assembly. When pilot pressure on the large face side of the piston is absent, the source pressure on the small face side of the piston shifts it away from the diaphragm to permit the diaphragm to uncover and open the flow path.

A second embodiment of the valve assembly uses an integral piston and valve wherein one face of the piston is directly exposed to pilot pressure from the piezo valve and the other face of the piston is both directly exposed to operating pressure from the gas source and has a sealing surface that, when engaged with the valve seat, functions to close the valve assembly.

A third embodiment of the valve assembly uses a piston confined between a ball valve and a diaphragm. The ball valve directly opens and closes the valve seat rather than the piston, although the ball valve is physically moved by the piston as the piston responds to the presence or absence of pressure on its opposite sides.

DETAILED DESCRIPTION OF THE DRAWINGS

DETAILED DESCRIPTION OF THE DRAWINGS

Figure 1:
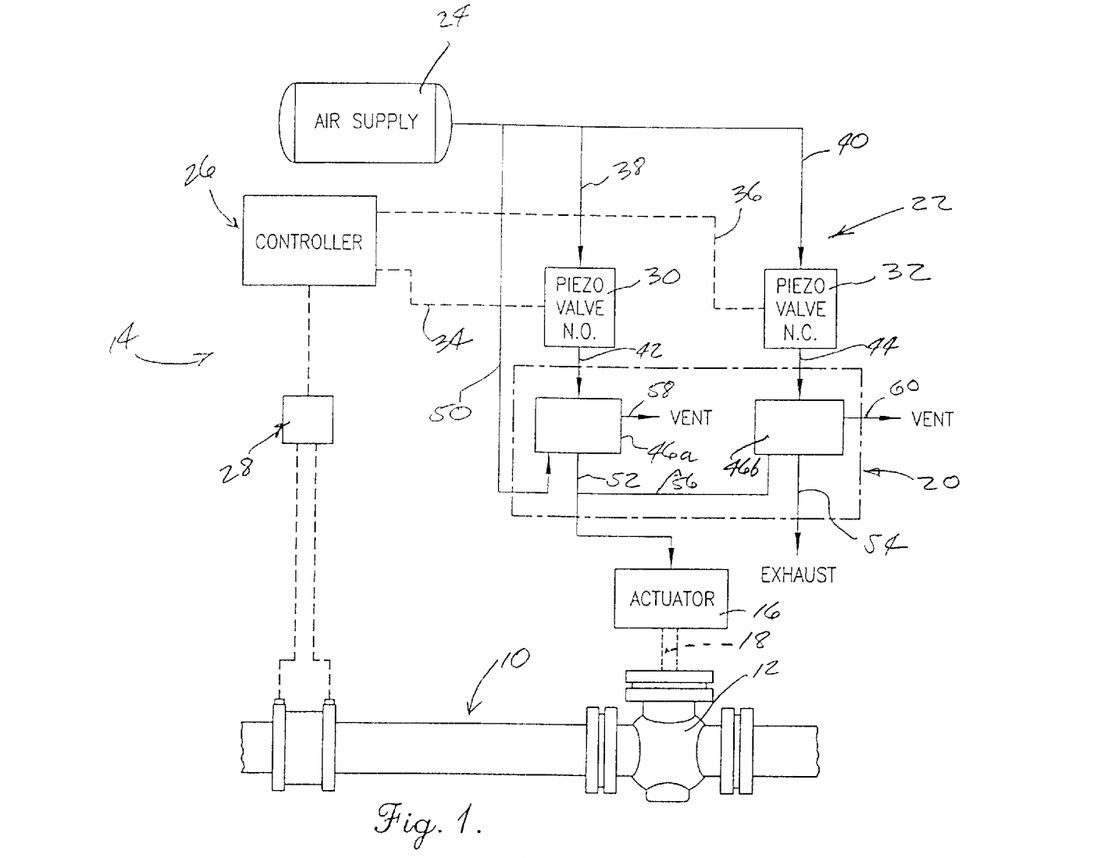
FIG. 1 is a schematic diagram of an exemplary installation in which a control system in accordance with the principles of the present invention is utilized.

FIG. 1 illustrates a typical pipe line 10 having a valve 12 that may be adjustably positioned within a number of different positions opening or closing the pipe line 10. A system for controlling the position of the valve 12 is broadly denoted by the numeral 14 and includes a pneumatically powered actuator 16 mechanically coupled with the valve 12 via a mechanical connection 18. The system 14 also includes a valve booster circuit 20, a pilot circuit 22 for the booster circuit 20, a source of pressurized gas 24 common to both the booster circuit 20 and the pilot circuit 22, and a controller 26 electrically connected to the pilot circuit 22. The control system 14 may also include a sensor 28 that is connected to the pipe line 10 in a suitable manner for detecting a flow condition within the pipe line 10 and reporting that condition to the controller so that a comparison can be made with a set or desired condition known to the controller. An appropriate adjustment of the valve 12 can be made accordingly.

The system 14 in FIG. 1 utilizes a single-acting actuator 16 that is pneumatically actuated in only one direction, the opposite direction of movement being provided by mechanical spring means or the like. However, as described below, the present invention also contemplates a double-acting system.

The pilot circuit 22 of system 14 includes pilot mechanism in the form of a pair of piezo valves 30 and 32. Depending upon the desired position for the valve 12 to assume in the event of an electrical failure, i.e., "fail open", "fail closed", or "fail at last position", the piezo valves may be selected to be normally open, normally closed, or a combination of both. The manner in which the actuator 16 is mechanically coupled to the valve 12 is also obviously a factor in determining the direction of movement of the valve 12, if any, to its failed position upon electrical failure. Although one particular set of normal states for the piezo valves 30,32 has been disclosed herein, it is to be understood that such disclosure is made for the purpose of example only and not with the intent of limiting the scope of the present invention.

In the illustrated embodiment, the valve 30 is normally open and the valve 32 is normally closed. The piezo valves may take the form, for example, of the valve disclosed in U.S. Pat. No. 5,343,894 in the name of Frisch, et al. Piezo valve 30 receives an electrical control signal from the controller 26 via a conductor 34, while the normally closed piezo valve 32 receives an electrical signal from the controller 26 via a conductor 36. The pilot circuit 22 further includes a pneumatic input line 38 to the normally open piezo valve 30 and a second pneumatic input line 40 to the normally closed piezo valve 32, both of such inputs 38 and 40 being connected to the source of pressurized gas 24 which, in its preferred form, is air. Pilot circuit 22 further includes a pneumatic output line 42 from the normally open piezo valve 30 and a similar pneumatic output line 44 from the normally closed piezo valve 32. Both output lines 42 and 44 are operable to output a pneumatic signal at system pressure. Each piezo valve 30, 32 is operable to connect its output line 42 or 44 to atmosphere for exhaust purposes when the valve is closed.

Figure 2:
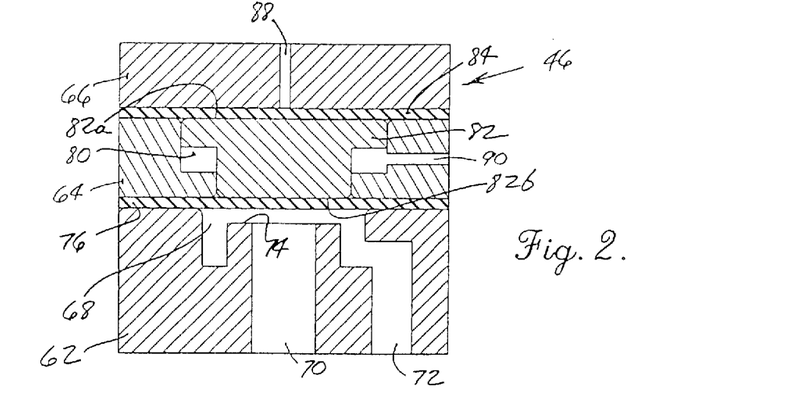
FIG. 2 is an enlarged, fragmentary cross-sectional view of one of the booster valve assemblies utilized in the control system.

The booster circuit 20 comprises booster mechanism that includes a pair of identical booster valve assemblies 46a and 46b constructed as illustrated by the valve assembly 46 in FIG. 2. Valve assembly 46a is a supply valve assembly connected to source 24 and valve assembly 46b is an exhaust valve assembly connected to atmosphere. Assemblies 46a and 46b may be contained within a common valve block or the like. In addition to the valve assemblies 46a and 46b, the booster circuit 20 includes an operating pressure input line 50 connected between the source of pressurized air 24 and the supply valve assembly 46a. Additionally, the booster circuit 20 includes an output line 52 from the valve 46a to the actuator 16, an exhaust line 54 from the exhaust valve assembly 46b to atmosphere, and an interconnecting line 56 between supply valve assembly 46a and exhaust valve assembly 46b. The two valve assemblies 46a and 46b also have vents 58 and 60 as will be described in more detail below.

Referring to FIG. 2, the valve assembly 46 comprises three primary sections stacked on top of one another, namely a bottom section 62, an intermediate section 64, and a top section 66. The bottom section 62 includes an internal chamber 68 having a supply port 70 and an exhaust port 72. The supply port 70 has a flat valve seat 74. A first flexible diaphragm 76 within the chamber 68 is movable between a closed position engagably covering the valve seat 74 so as to close the same and an open position shown in FIG. 2 in which the diaphragm 76 is up off the seat 74. When the diaphragm 76 is disengaged from the seat 74, a flow path is established between the supply port 70 and the exhaust port 72 through the chamber 68; when the diaphragm 76 is engaged with the seat 74, such flow path is closed.

The diaphragm 76 is sandwiched between the sections 62 and 64 and seals the chamber 68 of section 62 from a chamber 80 within the intermediate section 64. A piston 82 is confined within the chamber 80 but is shiftable axially thereof generally toward and away from the valve seat 74. In FIG. 2, the piston 82 is illustrated in its valve opening position in which it is spaced away from the valve seat 74 so as to allow the diaphragm 76 to likewise be spaced above the seat 74.

Sandwiched between the intermediate section 64 and the top section 66 is another flexible diaphragm 84 overlying the piston 82. When the piston 82 is lowered, a pilot chamber 86 (see FIG. 3) is defined on the upper side of the piston 82 between the diaphragm 84 and the top section 66, the pilot chamber 86 receiving a supply of pilot air at the operating pressure via an inlet 88 in the top section 66.

It will be noted that the piston 82 has an upper surface 82a that is substantially larger than its bottom surface 82b. Upper surface 82a is exposed to the effects of a pilot signal in the pilot chamber 86, while the lower surface 82b is exposed to an operating volume of air, at the same pressure as the pilot pressure, in the operating chamber 68. The supply port 70 and the exhaust port 72 are capable of passing air at a substantially higher volumetric rate than the piezo valves 30,32 and their pilot inlets 88. A vent port 90 in the chamber 80 below the enlarged pilot end of the piston 82 is adapted to communicate with the atmosphere.

Figure 3:
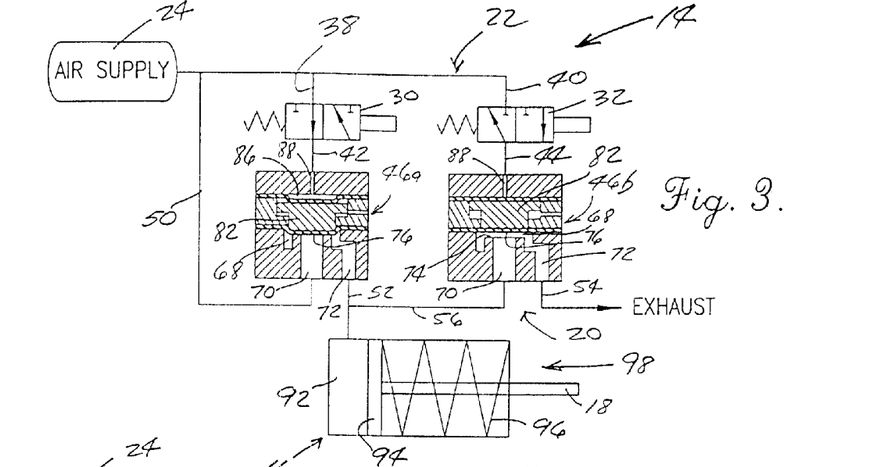
FIGS. 3, 4 and 5 are schematic illustrations of a preferred embodiment of the control system for a single-acting actuator, FIG. 3 illustrating the system in such a state that the actuator is moving in a direction to close a valve with which it is associated, FIG. 4 illustrating the system in a state for moving the actuator in a valve opening direction, and FIG. 5 illustrating the system in a state for holding the valve stationary in a selected position.
Figure 4:
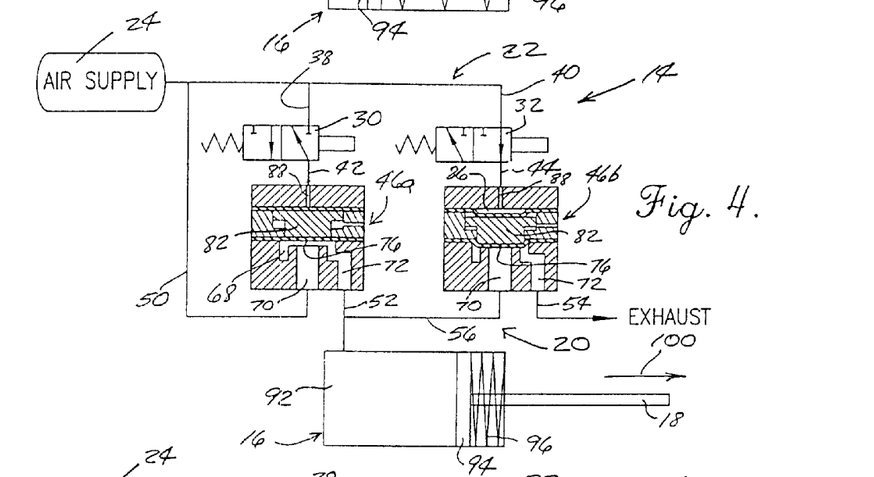
Figure 5:
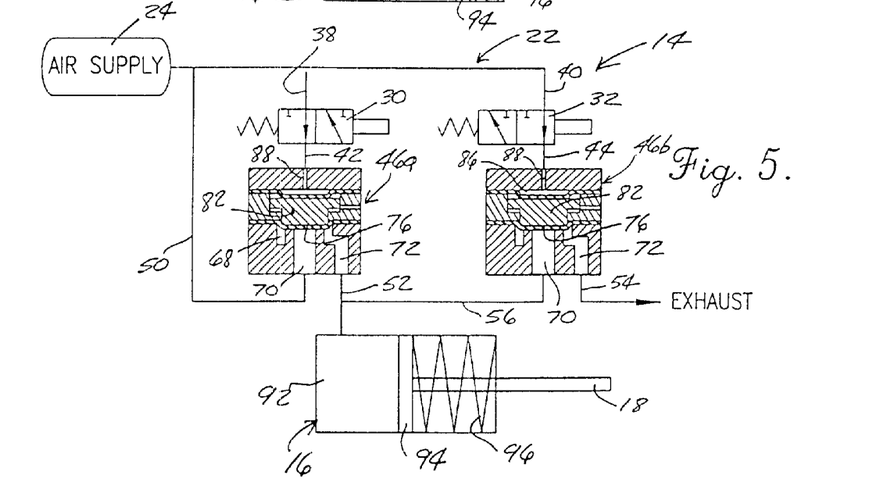

As illustrated in FIGS. 3, 4 and 5, which correspond to FIG. 1, the output line 42 from the normally open piezo valve 30 connects to the pilot inlet 88 of supply valve assembly 46a. Input line 50 from the air source 24 connects to the supply port 70 of supply valve assembly 46a, and the outlet line 52 connects to the exhaust port 72 of supply valve assembly 46a.

On the other hand, the output line 44 from normally closed piezo valve 32 connects to the pilot inlet 88 of exhaust valve assembly 46b, the interconnect line 56 is connected to the supply port 70 of exhaust valve assembly 46b, and the exhaust line 54 is connected to the exhaust port 72 of exhaust valve assembly 46b. Output line 52 from supply valve assembly 46a connects to the operating chamber 92 of actuator 16 so as to supply variable amounts of pressurized air to the chamber 92. A movable part of the actuator 16 illustrated in the preferred embodiment in the nature of a piston 94 is responsive to the increase or decrease of air within chamber 92 to move leftwardly or rightwardly as viewed in the figures so as to extend or retract the rod which forms the mechanical connection 18 with the control valve 12 as designated in FIG. 1. A spring 96 housed within the actuator 16 yieldably biases the piston 94 leftwardly viewing FIGS. 3, 4 and 5.

FIG. 3 illustrates the condition of the control system 14 for moving the piston 94 leftwardly in the direction of the arrow 98 to adjust the valve 12. This may be selected as the direction for closing the valve 12, if desired. In this condition, no electrical signal is supplied from the controller 26 to the piezo valves 30 and 32 such that they remain in their normal, de-energized condition. Thus, the normally open valve 30 allows a pneumatic pilot signal to pass along the output line 42 and into the pilot chamber 86 of supply valve assembly 46a. Supply pressure is also present in input line 50 and at supply port 70 of the supply valve assembly 46a, but the pressures are the same in both pilot chamber 86 and operating chamber 68. Consequently, due to the larger surface area on the upper side of the piston 82, the piston 82 is moved downwardly, forcing the diaphragm 76 against the seat 74 and closing off the supply port 70. This closes supply valve assembly 46a and no pressurized air passes to the actuator 16.

The pilot valve 32 is closed at this time, with output line 44 connected to atmosphere. Thus, only atmospheric pressure is applied to the upper side of the piston 82 of exhaust valve assembly 46b at this time. Consequently, pressurized air at supply port 70 of exhaust valve assembly 46b lifts the diaphragm 76 of exhaust valve assembly 46b off the seat 74, thereby opening exhaust valve assembly 46b, as air is forced out of the operating chamber 92 by the piston 94 under the influence of the return spring 96. With the diaphragm 76 off its seat, an open flow path is established between the interconnect line 56 and the exhaust line 54 via the supply port 70, the chamber 68, and the exhaust port 72 of exhaust valve assembly 46b.

FIG. 4 illustrates the condition of the control system 14 for moving the rod 18 of the actuator 16 rightwardly in the direction of the arrow 100. This may be selected as the direction for opening the valve 12, if desired. In this condition, the controller 26 has supplied electrical control signals to the piezo pilot valves 30 and 32 such that they are both in their energized positions. Thus, the piezo valve 30 becomes closed, while the piezo valve 32 becomes opened.

When the piezo valve 30 is closed, output line 42 to supply valve 46a is connected to atmosphere. Thus, air at supply pressure unseats the diaphragm 76 via input line 50 and supply port 70, opening supply valve assembly 46a. A flow path is opened between supply port 70 and exhaust port 72 of supply valve assembly 46a, causing significant volumes of pressurized air to enter the operating chamber 92 of actuator 16 via output line 52. The exhaust valve assembly 46b will be closed at this time due to the fact that supply pressure is applied to its pilot chamber 86 via the opened pilot valve 32. Consequently, the piston 82 of exhaust valve assembly 46b keeps the diaphragm 76 seated at this time, blocking access of the interconnect line 56 to the exhaust line 54. Therefore, the piston 94 moves rightwardly as the volume within chamber 92 increases, against the resistance of the return spring 96.

FIG. 5 illustrates the condition of the system 14 for holding the actuator 16 stationary in any selected position. The piezo valve 30 is not receiving a signal from the controller 26 at this time; thus, the de-energized valve 30 remains open to pass a pneumatic pilot signal into the pilot chamber 86 of supply valve assembly 46a via output line 42. Consequently, the piston 82 of supply valve assembly 46a pushes the diaphragm 76 against seat 74 to close the supply port 70, even though supply pressure is present in the input line 50 and at supply port 70.

On the other hand, the normally closed piezo valve 32 receives a control signal from the controller 26 and becomes energized so as to allow passage therethrough of air at supply pressure. Supply pressure is therefore applied to the pilot chamber 86 of exhaust valve assembly 46b via output line 44. This shifts piston 82 of exhaust valve assembly 46b against the diaphragm 76, causing it to close the supply port 70, closing exhaust valve assembly 46b. Such closure of supply port 70 has the effect of closing off access of the operating chamber 42 to the exhaust line 54 such that the piston 94 of actuator 16 cannot move leftwardly. Moreover, the return spring 96 prevents it from moving rightwardly, and as there is no incoming air at supply pressure, the operating rod 18 of the actuator 16 stays in a fixed position.

DOUBLE-ACTING SYSTEM

Figure 6:
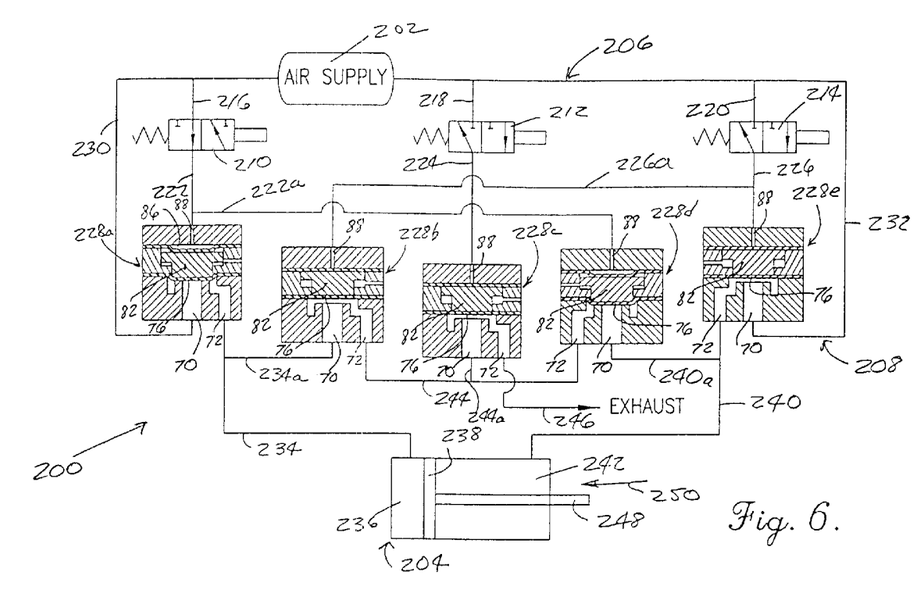
FIGS. 6, 7 and 8 disclose a second embodiment of a system for use with a double-acting actuator, FIG. 6 illustrating the system in a state where in the actuator is moving in the valve closing direction, FIG. 7 illustrating the system in a state wherein the actuator is moving in the valve opening direction, and FIG. 8 illustrating the system in a state wherein the actuator is held stationary at a selected position.
Figure 7:
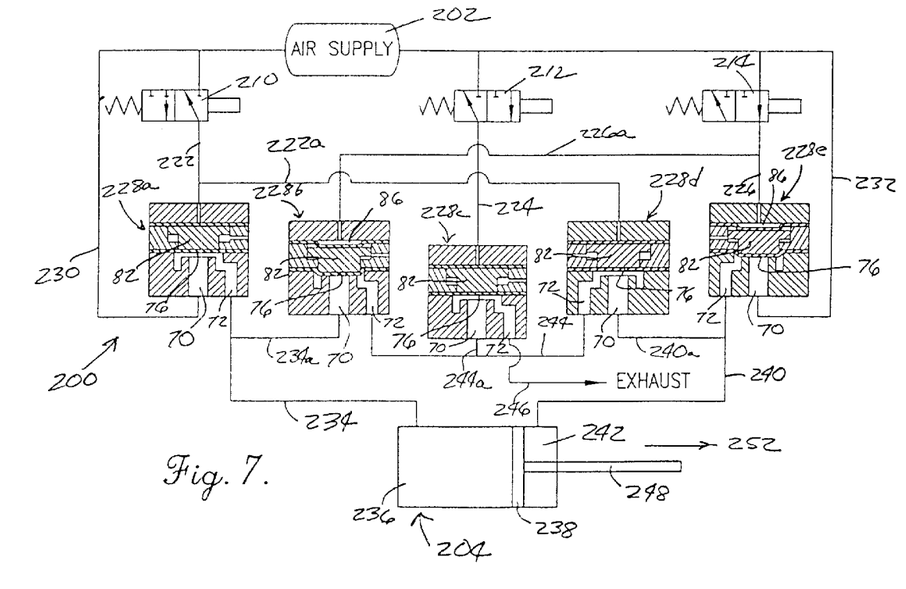
Figure 8:
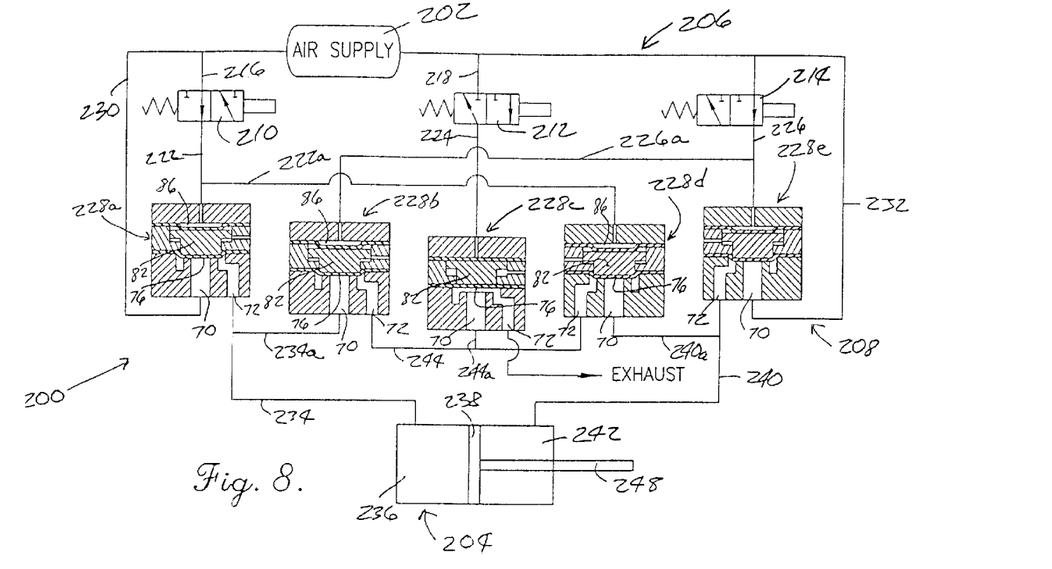

FIGS. 6, 7 and 8 illustrate a double-acting control system for performing the same functions as the single acting system of FIGS. 3–5. Instead of a return spring for the piston of the actuator, however, both sides of the piston have access to gas under supply pressure and atmosphere at appropriate times such that, depending upon which valves are opened and which are closed, the piston either moves to the right or left in response to changes in the volume of pressurized air introduced into the chambers on opposite sides of the piston. The double-acting system of FIGS. 6–8 utilizes the same booster valve assembly 46 as the single acting system, but five of such valve assemblies 46 are utilized in the double-acting system and they are arranged differently. Similarly, although the same type of piezo valves are utilized, three of such valves are utilized instead of two, one of them being normally open and two being normally closed.

The double-acting system 200 of FIGS. 6–8 includes a source of pressurized air 202 (or other gas), a double-acting actuator 204, a pilot circuit 206, and a booster circuit 208. In this example, the pilot circuit 206 includes pilot valve mechanism in the form of three piezo valves 210, 212 and 214. As with pilot circuit 22, depending upon the desired position for the valve 12 to assume in the event of an electrical failure, i.e., "fail open", "fail closed", or "fail at last position", the piezo valves of pilot circuit 206 may be selected to be normally open, normally closed, or combinations of both. Although one particular set of normal states for the piezo valves 210, 212, and 214 has been disclosed herein, it is to be understood that such disclosure is made for the purpose of example only and not with the intent of limiting the scope of the present invention.

In the illustrated embodiment, the piezo valve 210 is normally open, while piezo valves 212 and 214 are normally closed. Valve 210 has an input line 216, the valve 212 has an input line 218, and valve 214 has an input line 220, all in direct communication with the air source 202. Valve 210 has an output line 222, valve 218 has an output line 224, and valve 214 has an output line 226. Piezo valves 210–214 are operable when closed to connect their respective output lines 222–226 to atmosphere.

The booster circuit 208 includes booster valve mechanism in the form of five of the booster valve assemblies 46. There is a supply valve assembly and an exhaust valve assembly for each end of the actuator 204, as well as a single control valve assembly that is common to the two exhaust valve assemblies and determines when the exhaust valve assemblies will be open to atmosphere. In the double-acting system 200, the five valve assemblies have been designated as supply valve assembly 228a, exhaust valve assembly 228b, control valve assembly 228c, exhaust valve assembly 228d, and supply valve assembly 228e. Each of the booster valve assemblies 228a–e is identical to the valve assembly 46 illustrated in FIG. 2, and the internal parts of the booster valve assemblies 228a–e will be described using the same reference numerals for such parts as used with respect to FIG. 2. In addition to the booster valve assemblies 228a–e, the booster circuit 208 also includes a number of flow lines. Such flow lines include an input line 230 from the air source 202 to the supply port 70 of supply valve assembly 228a. Another input line 232 is connected between the air source 202 and the supply port 70 of supply valve assembly 228e. An output line 234 connects the exhaust port 72 of supply valve assembly 228a with a chamber 236 on the left side of the piston 238 of actuator 204, while an output line 240 connects the exhaust port 72 of supply valve assembly 228e with a chamber 242 on the right side of the piston 238. The output line 234 from supply valve assembly 228a has a branch 234a that connects to the supply port 70 of exhaust valve assembly 228b, while the output line 240 has a branch 240a that connects to the supply port 70 of exhaust valve assembly 228d. An interconnect line 244 connects the exhaust port 72 of exhaust valve assembly 228b with the exhaust port 72 of exhaust valve assembly 228d. Interconnect line 244 has a branch 244a connected to the supply port 70 of control valve assembly 228c, and an exhaust line 246 communicates the exhaust port 72 of control valve assembly 228c with atmosphere.

The pilot circuit 206, in addition to the piezo valves 210–214, the input lines 216–220, and the output lines 222–226, also includes a branch 222a of output line 222 that connects to the pilot inlet 88 of exhaust valve assembly 228d, and a branch 226a of output line 226 that connects to the pilot inlet 88 of exhaust valve assembly 228b. Output line 222 from piezo valve 210 connects to the pilot inlet 88 of supply valve assembly 228a, the output line 224 of piezo valve 212 connects to the pilot inlet 88 of control valve assembly 228c, and the outlet line 226 of piezo valve 214 connects to the pilot inlet 88 of supply valve assembly 228e.

FIG. 6 illustrates the condition of the control system 200 for moving the rod 248 of the actuator 204 leftwardly as indicated by the arrow 250. This may be selected as the valve closing direction for valve 12, if desired. In this condition, all three of the piezo valves 210, 212 and 214 are de-energized. Thus, pressurized air flows through the normally open piezo valve 210, but not through the normally closed piezo valves 212 and 214. This applies supply pressure to output line 222 and branch 222a, introducing pilot pressure into the pilot chambers 86 of supply valve assembly 228a and exhaust valve assembly 228d. Thus, supply valve assembly 228a and exhaust valve assembly 228d are closed. Consequently, no pressurized air flows along the output line 234 into the left chamber 236. On the other hand, because pilot valve 214 is in a closed condition, no pilot pressure exists in output line 226 such that diaphragm 76 of supply valve assembly 228e is free to be unseated by supply pressure in the input line 232 and supply port 70. Thus, supply valve assembly 228e opens, creating a flow path to the right operating chamber 242 via line 232 and 240, causing the piston 238 to shift leftwardly.

It will be noted that when piston 238 is shifting leftwardly, air in the left chamber 236 needs to be exhausted. This is accommodated due to the fact that closed piezo valve 212 prevents a pilot signal on output line 224, and closed piezo valve 214 connects branch 226a to atmosphere. Thus, exhaust valve assembly 228b and control valve assembly 228c open as their diaphragms 76 are free to be unseated by the air seeking to exhaust from the left chamber 236 of actuator 204, opening chamber 236 to atmosphere. Such exhaust path comprises line 234, branch 234a, open exhaust valve assembly 228b, line 244, branch 244a, open control valve assembly 228c, and exhaust line 246.

FIG. 7 illustrates the condition of the control system 200 for moving the rod 248 of actuator 204 rightwardly as illustrated by the arrow 252. This may be selected as the valve opening direction for the valve 12, if desired. In this condition, the normally open piezo valve 210 is energized by a control signal from the controller 26, the normally closed piezo valve 212 is de-energized, and the normally closed piezo valve 214 is energized. Consequently, no pilot pressure is present on output line 222 for supply valve assembly 228a, or on branch line 222a for exhaust valve assembly 228d. These valve assemblies are therefore free to open. Consequently, pressurized air in supply line 230 and at supply port 70 of supply valve assembly 228a unseats the diaphragm 76 of that assembly, causing pressurized air to be introduced into the left chamber 236 of the actuator 204 via output line 234 from supply valve assembly 228a. Since trapped air within the right chamber 242 of the actuator 204 must be exhausted by the rightwardly moving piston 238, chamber 242 becomes open to atmosphere via line 240, branch 240a, open exhaust valve assembly 228d, interconnect line 244, branch 244a, open control valve assembly 228c, and exhaust line 246. Due to the fact that no pilot pressure appears in branch 222a, the diaphragm 76 of exhaust valve assembly 228d can be unseated. Likewise, because no pilot pressure exists in output line 224 to control valve assembly 228c due to the closed piezo valve 212, the diaphragm 76 of control valve assembly 228c is unseated by the exhausting air.

At this time, although supply pressure exists in input line 232 and at supply port 70 of supply valve assembly 228e, the diaphragm 76 thereof cannot unseat because pilot pressure is present in the pilot chamber 86 via open piezo valve 214 and output line 226. The pilot pressure in output line 226 is also communicated to branch 226a, creating pilot pressure within the pilot chamber 86 of exhaust valve assembly 228b. This causes the diaphragm 76 thereof to close supply port 70, despite the presence of pressurized air at port 70 assembly via branch 234a.

FIG. 8 illustrates the condition of the control system 200 for holding the actuator 204 in any selected position. In this condition, the normally open piezo valve 210 is de-energized, the normally closed piezo valve 212 is de-energized, and the normally closed piezo valve 214 is energized by a control signal from the controller 26. Consequently, pilot pressure is present in the pilot chambers 86 of supply valve assembly 228a and exhaust valve assembly 228d to close those valve assemblies. Likewise, pilot pressure is present in the pilot chambers 86 of supply valve assembly 228e and exhaust valve assembly 228b via output line 226 and branch 226a to close those valve assemblies. Thus, lines 234 and 240 connected to the actuator chambers 236 and 242 respectively are effectively blocked from both the source of supply 202 and atmosphere. Consequently, the piston 238 is trapped against movement, holding the rod 248 in a fixed position.

It will be noted that although the control valve assembly 228c is free to be opened at this time due to a lack of a pneumatic pilot signal from closed piezo valve 212, there is no exhausting air from either side of the actuator 204, and there is no way such chambers can be communicated with the exhaust line 246 through the opened control valve assembly 228c.

ALTERNATIVE EMBODIMENTS OF BOOSTER VALVE ASSEMBLY

Figure 9:
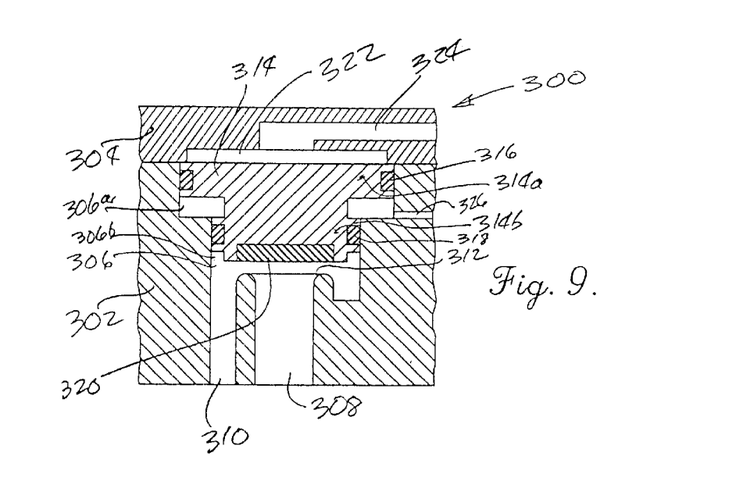
FIG. 9 is an enlarged, fragmentary cross-sectional view of an alternative embodiment for the booster valve assembly.

FIG. 9 illustrates an alternative embodiment 300 of the booster valve assembly 46. The primary difference between the booster valve assembly 46 and the booster valve assembly 300 lies in the internal movable valve component. Whereas in the valve assembly 46 the valve component comprises two major parts, i.e., the diaphragm 76 and the separate piston 82, in the valve assembly 300, the valve component comprises a single integrated part wherein the two functions of the piston and diaphragm are combined into a single structure.

Valve assembly 300 includes a lower section 302 and a upper section 304. The lower section 302 includes an internal chamber 306 having a supply port 308 and an exhaust port 310. The supply port 308 has a valve seat 312 at its upper end. The chamber 306 has an upper enlarged portion 306a and a lower, smaller diameter portion 306b. A piston 314 reciprocates within the chamber 306, the larger diameter portion 314a thereof being received within the enlarged portion 306a and the smaller diameter portion 314b thereof being received within the smaller diameter portion 306b of the chamber 306. O-ring seals 316 and 318 encircle the enlarged piston portion 314a and the smaller piston portion 314b respectively so as to seal the chamber portions 306a and 306b from one another. A sealing pad 320 at the lower end of the piston 314 faces the valve seat 312 and makes sealing engagement therewith when the piston 314 is in its closed position, shifted downwardly from the opened position illustrated in FIG. 9.

The upper section 304 of valve assembly 300 includes a pilot chamber 322 immediately overlying the upper surface of the piston 314. An inlet 324 in the upper section 304 is used to communicate the pilot chamber 322 with a source of pressurized air. The surface area of the upper face of the piston 314 exposed to pressurized air in the pilot chamber 322 is considerably larger than the surface area of the bottom face of the piston 314 exposed to pressurized air within the chamber 306. Consequently, when pressures are equal on opposite faces of the piston 314, it is shifted down into its closed position. A vent 326 within the lower section 302 communicates the larger diameter chamber portion 306a with the atmosphere.

It will be appreciated that the valve assembly 300 may be substituted for the assembly 46 in either of the applications illustrated in FIGS. 1–8. The flnctions and operating sequences are the same in either case.

Figure 10:
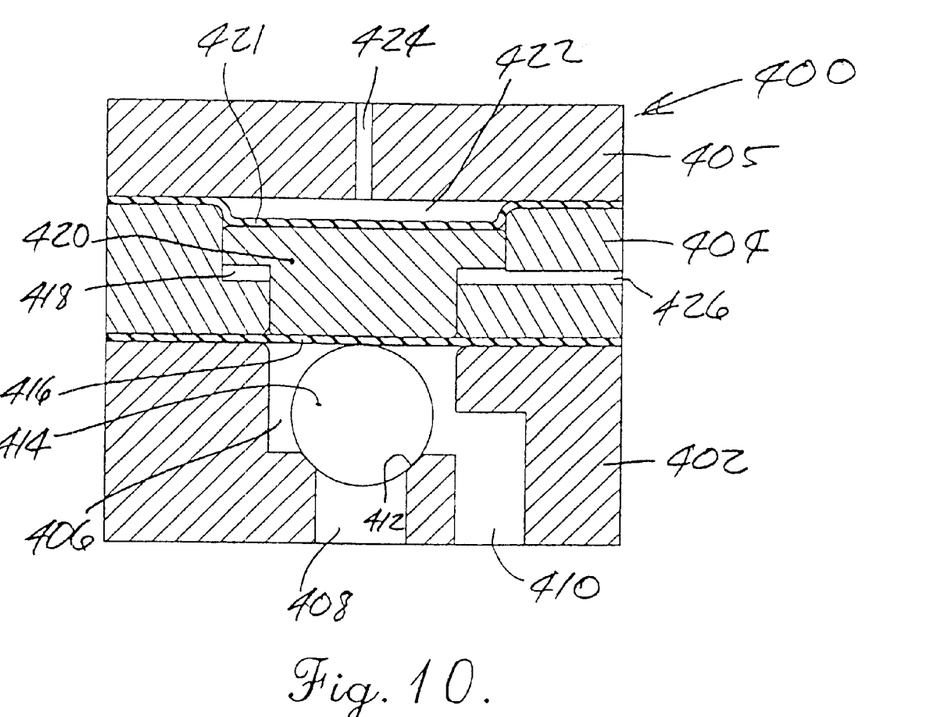
FIG. 10 is an enlarged, fragmentary cross-sectional view of another alternative embodiment for the booster valve assembly.

FIG. 10 illustrates another alternative embodiment 400 of booster valve assembly. The valve assembly 400 comprises three primary sections stacked on top of one another, i.e., a bottom section 402, an intermediate section 404, and a top section 405. The bottom section 402 includes an internal chamber 406 having a supply port 408 and an exhaust port 410. The supply port 408 has a beveled valve seat 412. A valve ball 414 within the chamber 406 is movable between a closed position engaging the valve seat 412 so as to close the same and an open position in which the ball 414 is up off the seat 412. When the ball 414 is disengaged from the seat 412, a flow path is established between the supply port 408 and the exhaust port 410 through the chamber 406; when the ball 414 is engaged with the seat 412, such flow path is closed.

A diaphragm 416 is sandwiched between the sections 402 and 404 and seals the chamber 406 of section 402 from a chamber 418 within the intermediate section 404. A piston 420 is confined within the chamber 404 but is shiftable axially thereof generally toward and away from the valve seat 412. In FIG. 10, the piston 420 is illustrated in its valve closing position in which it pushes the valve ball 414 into engagement with the valve seat 412.

Sandwiched between the intermediate section 404 and the top section 405 is another flexible diaphragm 421 overlying the piston 420. When the piston 420 is lowered, a pilot chamber 422 is defined on the upper side of the piston 420 between the diaphragm 421 and the top section 405, the pilot chamber 422 receiving a supply of pilot air at the operating pressure via an inlet 424 in the top section 405. A vent port 426 in the chamber 418 below the enlarged pilot end of the piston 420 is adapted to communicate with the atmosphere. The valve assembly 400 may be substituted for the assembly 46 in either of the applications illustrated in FIGS. 1–8. The functions and operating sequences are the same in either case.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. In a system for controlling the position of a pneumatically-operated valve, the improvement comprising:

an actuator provided with an internal operating chamber adapted to receive operating gas under pressure, said actuator including a movable part within said operating chamber movable in response to an increase in volume of pressurized gas within the chamber, said movable part being adapted to be operably coupled with the valve for shifting the valve in response to movement of said part;

a source gas at an operating pressure;

an operating circuit between the gas source and the actuator for communicating the gas source with the operating chamber of the actuator, said operating circuit including volume booster mechanism for controlling whether the gas source is in or out of communication with the operating chamber of the actuator;

a pilot circuit between the gas source and the volume booster mechanism, said pilot circuit including pilot valve mechanism responsive to a control signal to produce a pilot gas output at said operating pressure, said volume booster mechanism being operable to produce a flow of operating gas at a higher volumetric rate than said pilot gas output; and a controller connected with said pilot valve mechanism and operable to send a control signal to said pilot valve mechanism, said volume booster mechanism being responsive to pilot gas output at said operating pressure from said pilot valve mechanism to selectively communicate the actuator with the gas source or atmosphere, said pilot valve mechanism including piezo devices.

2. In a system as claimed in claim 1, said controller comprising a computer.

3. In a system as claimed in claim 2, said volume booster mechanism including a plurality of valve assemblies each having an operating gas flow path and a valve movable between an open position opening said flow path to open the valve assembly and a closed position closing said flow path to close the valve assembly, said valve having a pilot surface disposed for communication with said pilot circuit and a booster surface disposed for communication with said booster circuit, the surface area of said pilot surface being of different size than the surface area of said booster surface whereby the valve moves to one of said positions when both said surfaces are exposed to said operating pressure from both the pilot circuit and the booster circuit, and the valve moves to the other of said positions when only the smaller surface is exposed to said operating pressure from one of said circuits.

4. In a system as claimed in claim 3, said pilot surface of each valve having a larger surface area than the booster surface of each valve.

5. In a system as claimed in claim 4, said actuator being single-acting, with said movable part having a return spring operably coupled therewith for moving the part in a direction opposite to the direction of movement of the part by operating gas in said chamber.

6. In a system as claimed in claim 5, said plurality of valve assemblies including a supply valve assembly connected to said source of supply and an exhaust valve assembly connected to atmosphere, said pilot valve mechanism including a pair of electrically actuated valves connected to the pilot surface of said supply valve assembly and the pilot surface of said exhaust valve assembly respectively, said operating chamber of the actuator being open to said source of supply when the supply valve assembly is open and the exhaust valve assembly is closed for increasing pressure in the operating chamber, said operating chamber of the actuator being open to atmosphere when the supply valve assembly is closed and the exhaust valve assembly is open for decreasing pressure in the operating chamber.

7. In a system as claimed in claim 6, said valve of each valve assembly including a valve seat and a flexible diaphragm, said diaphragm being engaged with said seat when the valve is in its closed position and being disengaged from the seat when the valve is in its open position, said valve of each valve assembly further including a piston presenting said pilot surface for moving the diaphragm into engagement with said seat to close the valve when the piston is subject to operating pressure from the corresponding pilot valve.

8. In a system as claimed in claim 7, each valve assembly further including a second flexible diaphragm across the pilot surface of the piston.

9. In a system as claimed in claim 6, said valve of each valve assembly including a valve seat and a piston, one face of said piston comprising said pilot surface and an opposite face of said piston comprising said booster surface, said booster surface of the piston being sealingly engaged with said seat when the valve is in said closed position and being disengaged from said seat when the valve is in said open position.

10. In a system as claimed in claim 4, said actuator being double-acting, having a first operating chamber on one side of the movable part and a second operating chamber on the opposite side of the movable part, said volume booster mechanism being operable to control communication between the gas source and both of said operating chambers.

11. In a system for controlling the position of a pneumatically-operated valve, the improvement comprising:

an actuator provided with an internal operating chamber adapted to receive operating gas under pressure, said actuator including a movable part within said operating chamber movable in response to an increase in volume of pressurized gas within the chamber, said movable part being adapted to be operably coupled with the valve for shifting the valve in response to movement of said part;

a source gas at an operating pressure;

an operating circuit between the gas source and the actuator for communicating the gas source with the operating chamber of the actuator, said operating circuit including volume booster mechanism for controlling whether the gas source is in or out of communication with the operating chamber of the actuator;

a pilot circuit between the gas source and the volume booster mechanism, said pilot circuit including pilot valve mechanism responsive to a control signal to produce a pilot gas output at said operating pressure, said volume booster mechanism being operable to produce a flow of operating gas at a higher volumetric rate than said pilot gas output; and a controller connected with said pilot valve mechanism and operable to send a control signal to said pilot valve mechanism, said volume booster mechanism being responsive to pilot gas output at said operating pressure from said pilot valve mechanism to selectively communicate the actuator with the gas source or atmosphere, said volume booster mechanism including a plurality of valve assemblies each having an operating gas flow path and a valve movable between an open position opening said flow path to open the valve assembly and a closed position closing said flow path to close the valve assembly, said valve having a pilot surface disposed for communication with said pilot circuit and a booster surface disposed for communication with said booster circuit, the surface area of said pilot surface being of different size than the surface area of said booster surface whereby the valve moves to one of said positions when both said surfaces are exposed to said operating pressure from both the pilot circuit and the booster circuit, and the valve moves to the other of said positions when only the smaller surface is exposed to said operating pressure from one of said circuits, said pilot surface of each valve having a larger surface area than the booster surface of each valve, said actuator being double-acting, having a first operating chamber on one side of the movable part and a second operating chamber on the opposite side of the movable part, said volume booster mechanism being operable to control communication between the gas source and both of said operating chambers, said plurality of valve assemblies including a first supply valve assembly connected to said source of supply and a first exhaust valve assembly for said first operating chamber, a second supply valve assembly connected to said source of supply and a second exhaust valve assembly for said second operating chamber, and a control valve assembly between said exhaust valve assemblies and atmosphere, said pilot valve mechanism including first, second, and third electrically actuated valves, said first electrically actuated valve being connected to the pilot surface of said first supply valve assembly and the pilot surface of said second exhaust valve assembly, said second electrically actuated valve being connected to the pilot surface of said second supply valve assembly and the pilot surface of said first exhaust valve assembly, and said third electrically actuated valve being connected to the pilot surface of said control valve assembly, said first operating chamber being open to said source of supply when the first supply valve assembly is open, the first exhaust valve assembly is closed, the second supply valve assembly is closed, the second exhaust valve assembly is open to atmosphere, and the control valve assembly is open to atmosphere for increasing the pressure in the first operating chamber and decreasing the pressure in the second operating chamber, said second operating chamber being open to said source of supply when the second supply valve assembly is open, the second exhaust valve assembly is closed, the first supply valve assembly is closed, the first exhaust valve assembly is open to atmosphere, and the control valve assembly is open to atmosphere for increasing the pressure in the second operating chamber and decreasing the pressure in the first operating chamber, said operating chambers being blocked from said source of supply and from atmosphere when the supply valve assemblies and the exhaust valve assemblies are closed.

12. In a system as claimed in claim 11, said valve of each valve assembly including a valve seat and a flexible diaphragm, said diaphragm being engaged with said seat when the valve is in its closed position and being disengaged from the seat when the valve is in its open position, said valve of each valve assembly further including a piston presenting said pilot surface for moving the diaphragm into engagement with said seat to close the valve when the piston is subject to operating pressure from the corresponding pilot valve.

13. In a system as claimed in claim 12, each valve assembly further including a second flexible diaphragm across the pilot surface of the piston.

14. In a system as claimed in claim 11, said valve of each valve assembly including a valve seat and a piston, one face of said piston comprising said pilot surface and an opposite face of said piston comprising said booster surface, said booster surface of the piston being sealingly engaged with said seat when the valve is in said closed position and being disengaged from said seat when the valve is in said open position.

15. In a system as claimed in claim 11, said valve of each valve assembly including a valve seat and a resilient ball, said ball being engaged with said seat when the valve is in its closed position and being disengaged from the seat when the valve is in its open position, said valve of each valve assembly further including a piston presenting said pilot surface for moving the ball into engagement with said seat to close the valve when the piston is subject to operating pressure from the corresponding pilot valve.

16. In a system as claimed in claim 11, said electrically actuated valves being piezo valves.

17. In a system for controlling the position of a pneumatically-operated valve, the improvement comprising:

an actuator provided with an internal operating chamber adapted to receive operating gas under pressure, said actuator including a movable part within said operating chamber movable in response to an increase in volume of pressurized gas within the chamber, said movable part being adapted to be operably coupled with the valve for shifting the valve in response to movement of said part;

a source gas at an operating pressure;

an operating circuit between the gas source and the actuator for communicating the gas source with the operating chamber of the actuator, said operating circuit including volume booster mechanism for controlling whether the gas source is in or out of communication with the operating chamber of the actuator;

a pilot circuit between the gas source and the volume booster mechanism, said pilot circuit including pilot valve mechanism responsive to a control signal to produce a pilot gas output at said operating pressure, said volume booster mechanism being operable to produce a flow of operating gas at a higher volumetric rate than said pilot gas output; and a controller connected with said pilot valve mechanism and operable to send a control signal to said pilot valve mechanism, said volume booster mechanism being responsive to pilot gas output at said operating pressure from said pilot valve mechanism to selectively communicate the actuator with the gas source or atmosphere, said volume booster mechanism including a plurality of valve assemblies each having an operating gas flow path and a valve movable between an open position opening said flow path to open the valve assembly and a closed position closing said flow path to close the valve assembly, said valve having a pilot surface disposed for communication with said pilot circuit and a booster surface disposed for communication with said booster circuit, the surface area of said pilot surface being of different size than the surface area of said booster surface whereby the valve moves to one of said positions when both said surfaces are exposed to said operating pressure from both the pilot circuit and the booster circuit, and the valve moves to the other of said positions when only the smaller surface is exposed to said operating pressure from one of said circuits, said pilot surface of each valve having a larger surface area than the booster surface of each valve, said actuator being single-acting, with said movable part having a return spring operably coupled therewith for moving the part in a direction opposite to the direction of movement of the part by operating gas in said chamber, said plurality of valve assemblies including a supply valve assembly connected to said source of supply and an exhaust valve assembly connected to atmosphere, said pilot valve mechanism including a pair of electrically actuated valves connected to the pilot surface of said supply valve assembly and the pilot surface of said exhaust valve assembly respectively, said operating chamber of the actuator being open to said source of supply when the supply valve assembly is open and the exhaust valve assembly is closed for increasing pressure in the operating chamber, said operating chamber of the actuator being open to atmosphere when the supply valve assembly is closed and the exhaust valve assembly is open for decreasing pressure in the operating chamber, said valve of each valve assembly including a valve seat and a resilient ball, said ball being engaged with said seat when the valve is in its closed position and being disengaged from said seat when the valve is in its open position, said valve of each valve assembly further including a piston presenting said pilot surface for moving the ball into engagement with said seat to close the valve when the piston is subject to operating pressure from the corresponding pilot valve.

18. In a system for controlling the position of a pneumatically-operated valve, the improvement comprising:

an actuator provided with an internal operating chamber adapted to receive operating gas under pressure, said actuator including a movable part within said operating chamber movable in response to an increase in volume of pressurized gas within the chamber, said movable part being adapted to be operably coupled with the valve for shifting the valve in response to movement of said part;

a source gas at an operating pressure;

an operating circuit between the gas source and the actuator for communicating the gas source with the operating chamber of the actuator, said operating circuit including volume booster mechanism for controlling whether the gas source is in or out of communication with the operating chamber of the actuator;

a pilot circuit between the gas source and the volume booster mechanism, said pilot circuit including pilot valve mechanism responsive to a control signal to produce a pilot gas output at said operating pressure, said volume booster mechanism being operable to produce a flow of operating gas at a higher volumetric rate than said pilot gas output; and a controller connected with said pilot valve mechanism and operable to send a control signal to said pilot valve mechanism, said volume booster mechanism being responsive to pilot gas output at said operating pressure from said pilot valve mechanism to selectively communicate the actuator with the gas source or atmosphere, said volume booster mechanism including a plurality of valve assemblies each having an operating gas flow path and a valve movable between an open position opening said flow path to open the valve assembly and a closed position closing said flow path to close the valve assembly, said valve having a pilot surface disposed for communication with said pilot circuit and a booster surface disposed for communication with said booster circuit, the surface area of said pilot surface being of different size than the surface area of said booster surface whereby the valve moves to one of said positions when both said surfaces are exposed to said operating pressure from both the pilot circuit and the booster circuit, and the valve moves to the other of said positions when only the smaller surface is exposed to said operating pressure from one of said circuits, said pilot surface of each valve having a larger surface area than the booster surface of each valve, said actuator being single-acting, with said movable part having a return spring operably coupled therewith for moving the part in a direction opposite to the direction of movement of the part by operating gas in said chamber, said plurality of valve assemblies including a supply valve assembly connected to said source of supply and an exhaust valve assembly connected to atmosphere, said pilot valve mechanism including a pair of electrically actuated valves connected to the pilot surface of said supply valve assembly and the pilot surface of said exhaust valve assembly respectively, said operating chamber of the actuator being open to said source of supply when the supply valve assembly is open and the exhaust valve assembly is closed for increasing pressure in the operating chamber, said operating chamber of the actuator being open to atmosphere when the supply valve assembly is closed and the exhaust valve assembly is open for decreasing pressure in the operating chamber, said electrically actuated valves being piezo valves.

* * * * *

UNITED STATES PATENT AND TRADEMARK OFFICE
CERTIFICATE OF CORRECTION

PATENT NO.    : 6,357,335 B1
DATED         : March 19, 2002
INVENTOR(S)   : Lawrence Lafler et al.

It is certified that error appears in the above-identified patent and that said Letters Patent is hereby corrected as shown below:

<u>Title page,</u>
Item [73], please change "Sox" to -- SPX --.

Signed and Sealed this

Tenth Day of September, 2002

*Attest:*

*Attesting Officer*

JAMES E. ROGAN
*Director of the United States Patent and Trademark Office*